Nov. 14, 1933.     M. H. HUFFER     1,934,926
AUTOMOBILE LIFT
Filed Jan. 2, 1932
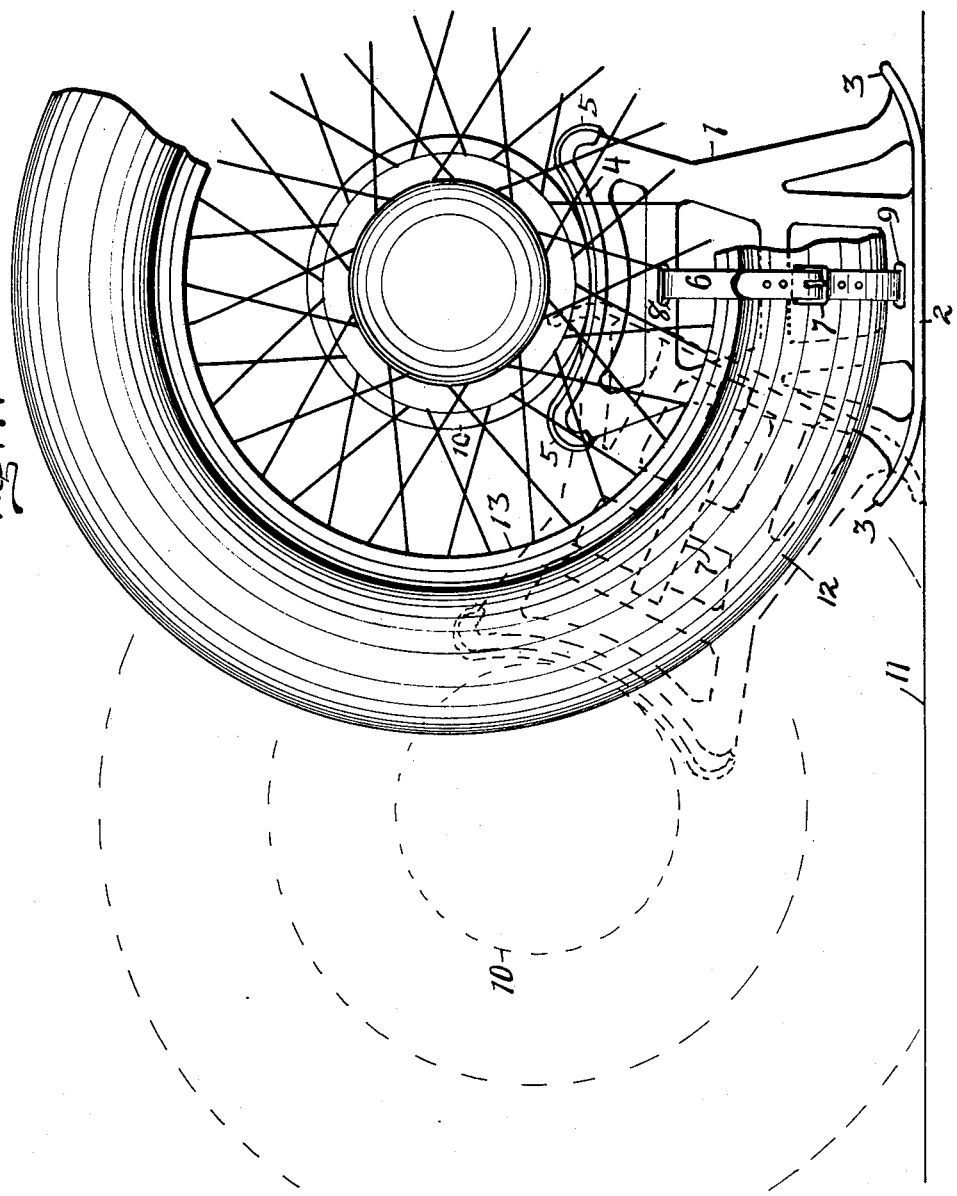
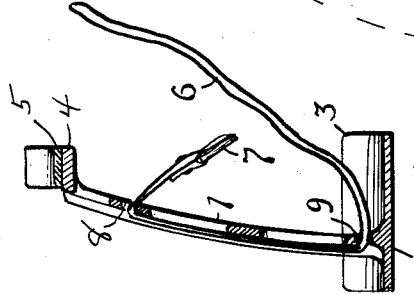
Morton H. Huffer INVENTOR
BY
A. G. Burns ATTORNEY Patented Nov. 14, 1933

1,934,926

UNITED STATES PATENT OFFICE 1,934,926

AUTOMOBILE LIFT

Morton H. Huffer, Warsaw, Ind.

Application January 2, 1932. Serial No. 584,349

3 Claims. (Cl. 254—94)

This invention relates to improvements in automobile lifts especially adapted to that type of automobiles in which a lift or support is applicable to a brake drum whereby the wheel is lifted from the ground to permit removal of the wheel therefrom.

One of the objects of the invention is to provide an appliance whereby any one of the wheels of an automobile, when one of its tires becomes deflated, may be elevated from the ground and removed from its mount by utilizing the traction of the automobile to establish elevation and support of its wheels when in need of repair or replacement.

An illustrative embodiment of the invention is shown in the accompanying drawing, in which:—

Fig. 1 is an end elevation of an automobile wheel in supported position upon a structure embodying the invention; and Fig. 2 is a vertical section of the lift shown in Fig. 1.

The illustrative embodiment of the invention consists of a frame 1 having a base 2, the central portion of which is flat and each end of which is upturned to form a rocker 3. The upper end of the frame has thereon a concave cradle 4 that has thereon a covering 5 preferably of rubber.

In connection with the frame is provided a strap 6 having a buckle 7 on one end, said strap being laced through suitable openings 8 and 9 therein.

In use, the invention is applied to the brake drum 10 of an automobile wheel by placing its cradle 4 against one side of the drum and with one of the rockers bearing upon the ground 11. The strap 6 is then placed so as to encompass the tire 12 and the rim 13 of the wheel and connected with the buckle 7 so that the frame structure is firmly bound about the wheel and rim. The automobile is then moved under its own power so that the drum is caused to move in the direction toward the lift, causing the lift to roll upon its lowermost rocker to erect position on the ground, and the drum is carried in the cradle to an elevated position.

The cradle is arcuate and is shaped in conformity with a radius preferably greater than that of the drum which facilitates movement of the drum into the cradle as it is moved by action of the automobile to the resting point upon the lift. The strap is then uncoupled from the buckle and the wheel may then be removed from its mount in the usual manner.

I claim:

1. In a lift for automobile wheels of the type having a brake drum, a structure comprising a frame with a flat base each end of which is upturned constituting rockers, and the top of which affords a cradle for the reception of the brake drum of a wheel, the concavity of which cradle conforms to a radius greater than that of said brake drum, and a strap having a buckle laced in said frame and adapted to bind the rim and tire of said wheel to said frame.

2. In a lift for automobile wheels of the type having a brake drum, a structure comprising a frame with a base provided with upturned ends constituting rockers, and the top of which affords a cradle for the reception of the brake drum of a wheel, and a strap having a buckle laced in said frame adapted to bind the rim and tire of said wheel to said frame.

3. In a lift for automobile wheels of the type having a brake drum, a structure comprising a frame with a base at one end and an arcuate cradle at its opposite end adapted to receive the brake drum of a wheel, and a strap attached to said frame for binding the rim and tire of said wheel to said frame.

MORTON H. HUFFER.